United States Patent
Yoshida

(10) Patent No.: US 8,709,620 B2
(45) Date of Patent: Apr. 29, 2014

(54) MAGNETIC RECORDING MEDIUM, INFORMATION STORAGE DEVICE, AND METHOD OF MANUFACTURING MAGNETIC RECORDING MEDIUM

(75) Inventor: Yuuki Yoshida, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 183 days.

(21) Appl. No.: 13/266,060

(22) PCT Filed: Apr. 20, 2010

(86) PCT No.: PCT/JP2010/057003
§ 371 (c)(1),
(2), (4) Date: Oct. 24, 2011

(87) PCT Pub. No.: WO2010/125950
PCT Pub. Date: Nov. 4, 2010

(65) Prior Publication Data
US 2012/0044597 A1     Feb. 23, 2012

(30) Foreign Application Priority Data
Apr. 28, 2009   (JP) .................. 2009-109951

(51) Int. Cl.
*G11B 5/66* (2006.01)
(52) U.S. Cl.
USPC .......................... 428/836; 360/135

(58) Field of Classification Search
None
See application file for complete search history.

(56) References Cited

U.S. PATENT DOCUMENTS

| 7,782,562 B2* | 8/2010 | Kamata et al. ............... 360/71 |
| 2003/0072971 A1 | 4/2003 | Fukutani et al. |
| 2010/0080895 A1* | 4/2010 | Shukla et al. ............... 427/180 |

FOREIGN PATENT DOCUMENTS

| CN | 1941090 A | 4/2007 |
| JP | 04-368609 A | 12/1992 |
| JP | 07-153047 A | 6/1995 |
| JP | 2003-196815 A | 7/2003 |
| JP | 2007-095115 A | 4/2007 |
| JP | 2007-242136 A | 9/2007 |
| JP | 2009-266352 A | 11/2009 |
| JP | 2010-079959 A | 4/2010 |

* cited by examiner

*Primary Examiner* — Holly Rickman
(74) *Attorney, Agent, or Firm* — Sughrue Mion, PLLC

(57) ABSTRACT

A magnetic recording medium includes a magnetic recording layer. The magnetic recording layer includes a first magnetic layer formed as a pattern portion that is a data portion in a servo region, a second magnetic layer formed as a non-pattern portion that is magnetized to be antiparallel with a magnetization direction of the first magnetic layer and of which coercive force is lower than a coercive force of the first magnetic layer, and a nonmagnetic layer formed between the first magnetic layer and the second magnetic layer.

5 Claims, 8 Drawing Sheets

SERVO REGION

MAGNETIC RECORDING MEDIUM, INFORMATION STORAGE DEVICE, AND METHOD OF MANUFACTURING MAGNETIC RECORDING MEDIUM

CROSS REFERENCE TO RELATED APPLICATIONS

This application is a National Stage of International Application No. PCT/JP2010/057003 filed Apr. 20, 2010, claiming priority based on Japanese Patent Application No. 2009-109951 filed Apr. 28, 2009, the contents of all of which are incorporated herein by reference in their entirety.

FIELD

The present invention relates to a magnetic recording medium, an information storage device, and a method of manufacturing the magnetic recording medium.

BACKGROUND

In recent years, reduction in size and an increase in capacity of a magnetic recording device such as a hard disk drive (HDD) have been rapidly accelerated. Therefore, recording density is demanded to be higher with an increase in capacity of a magnetic recording medium. In order to make the recording density higher, magnetic particles of the magnetic recording medium are miniaturized (diameter: approximately 8 nm). A perpendicular magnetic recording, i.e., a technology for magnetizing a recording surface in the direction perpendicular to the recording surface is employed for responding to the demand to make the recording density higher.

As a medium for the perpendicular magnetic recording for making the recording density of the magnetic recording medium higher, a discrete track medium (DTM) has been proposed. In the discrete track medium, a nonmagnetic region is formed between adjacent tracks and recording is performed on only the tracks formed of a magnetic material. Furthermore, a bit patterned medium (BPM) has been proposed. In the bit patterned medium, magnetic particles are isolated and a single bit pattern is produced so as to improve recording resolution.

The discrete track medium is patterned into a convex-concavo form radially and the bit patterned medium is patterned into a convex-concavo form both circumferentially and radially. On these media, a pattern having concave portions (non-pattern portions) and convex portions (pattern portions) in accordance with a servo pattern is also formed on a servo region, so that the recording density can be improved.

Here, an outline of the servo region of the patterned medium mentioned above is described. FIG. 11 is a cross-sectional view for explaining an example of a servo pattern on a conventional servo region 20. As illustrated in FIG. 11, the servo region 20 forming a magnetic recording medium has a configuration in which an intermediate layer 10 is laminated on an upper surface of a substrate 9, and a magnetic recording layer 11 on which a convex-concavo pattern is formed is provided on an upper surface of the intermediate layer 10.

As illustrated in FIG. 11, convex-concavo pattern portions are alternately formed on the magnetic recording layer 11. Magnetic recording layers 13 are provided on pattern portions 12 as convex portions and nonmagnetic layers 15 are filled into non-pattern portions 14 as concave portions. Note that information is expressed by presence or absence of magnetization in one direction that is either of an upward direction or a downward direction on the servo pattern. Therefore, as illustrated in FIG. 11, the magnetic recording layers 13 are formed as the magnetic recording layers 13 on which servo signals are magnetized in a predetermined direction (upward direction in FIG. 11).

Furthermore, as a configuration of the servo region of the magnetic recording medium of this type, the following configuration has been disclosed (for example, Patent Literature 1). In this configuration, upper magnetic layers of the concave portions in the convex-concavo pattern forming the servo region are removed, so that a coercive force of the concave portions is increased. The servo region is magnetized in one direction, so that a magnetization direction of the convex portions is inverted. In this manner, with the configuration in which the magnetization direction of the convex portions in the convex-concavo pattern on the servo region is inverted, the servo signals on the servo region can be increased.

CITATION LIST

Patent Literature

Patent Literature 1: Japanese Patent Application Laid-open No. 2007-95115

SUMMARY

Technical Problem

However, the servo pattern on the servo region that is formed in the above manner has the following problems. In the conventional discrete track medium and bit patterned medium described above, all of the pattern portions (convex portions) formed as the servo pattern on the servo region are magnetized in the same direction (upward direction in FIG. 11).

Note that on the servo pattern, areas of the pattern portions (convex portions) in the horizontal direction magnetized in one direction tend to be increased, unlike a data bit. Furthermore, a film thickness of the pattern portions (convex portions) in the vertical direction is required to be made smaller as the density is made higher. Accordingly, magnetization in the vertical direction is significantly unstable due to shape anisotropy thereof. Therefore, there arises a problem that the magnetization direction is inverted due to influences of diamagnetic fields and the like even if the pattern portions are magnetized in a predetermined direction at the time of manufacturing.

Specifically, as illustrated in FIG. 12, servo signals are recorded as magnetization on the recording magnetic layer 11 of the servo region 20. However, diamagnetic fields "b" in an opposite direction to a magnetization direction "a" of the magnetic recording layers 13 are generated on the magnetic recording layers 13. Furthermore, in the same manner, magnetic fields "c" that are generated from other magnetic recording layers 13 adjacent to the magnetic recording layers 13 are applied to the magnetic recording layers 13 as magnetic fields in an opposite direction (downward direction in FIG. 12) to the magnetization direction "a" of the magnetic recording layers 13.

Furthermore, areas of the convex portions of the recording magnetic layer 11 on the servo region 20 in an in-plane direction tend to be increased relative to the film thickness. Therefore, the diamagnetic fields "b" that are generated in the magnetic recording layers 13 become large. With this configuration, the magnetization direction "a" of the magnetic recording layers 13 becomes easier to be inverted. As a result, there arises a problem that the magnetization of the magnetic recording layers 13 forming the servo region 20 cannot be stabilized.

Furthermore, in the case of the technique disclosed in the above Patent Literature 1, there is a problem that although the servo signals can be increased on the servo region, the magnetic recording layer forming the servo region cannot be stabilized.

The present invention has been made in order to solve the above-described problems in the conventional techniques. An object of the invention is to provide a magnetic recording medium, an information storage device, and a method of manufacturing the magnetic recording medium all of which make it possible to obtain a stable servo signal, stabilize magnetization, and realize a medium having a high recording density.

Solution to Problem

The invention disclosed herein includes a magnetic recording layer that includes a first magnetic layer formed as a pattern portion that is a data portion in a servo region, a second magnetic layer formed as a non-pattern portion that is magnetized to be antiparallel with a magnetization direction of the first magnetic layer and of which coercive force is lower than a coercive force of the first magnetic layer, and a nonmagnetic layer formed between the first magnetic layer and the second magnetic layer.

Effect of the Invention

According to the disclosed invention, a magnetic recording layer on a servo region has a first magnetic layer formed as a pattern portion and a second magnetic layer formed as a non-pattern portion of which magnetization is opposite to that of the first magnetic layer and coercive force is lower than that of the first magnetic layer. Furthermore, a nonmagnetic layer is provided between both magnetic layers. Therefore, a more stable servo signal can be obtained by antiparallel magnetization by the second magnetic layer. With this configuration, the recording density of a magnetic recording medium can be made higher.

DESCRIPTION OF EMBODIMENTS

Hereinafter, preferred embodiments of a magnetic recording medium, an information storage device, and a method of manufacturing the magnetic recording medium that are disclosed in the present application are described in detail with reference to accompanying drawings. It is to be noted that the magnetic recording medium, the information storage device, and the method of manufacturing the magnetic recording medium that are disclosed in the present application are not limited by a first embodiment.

First Embodiment

Figure 1:
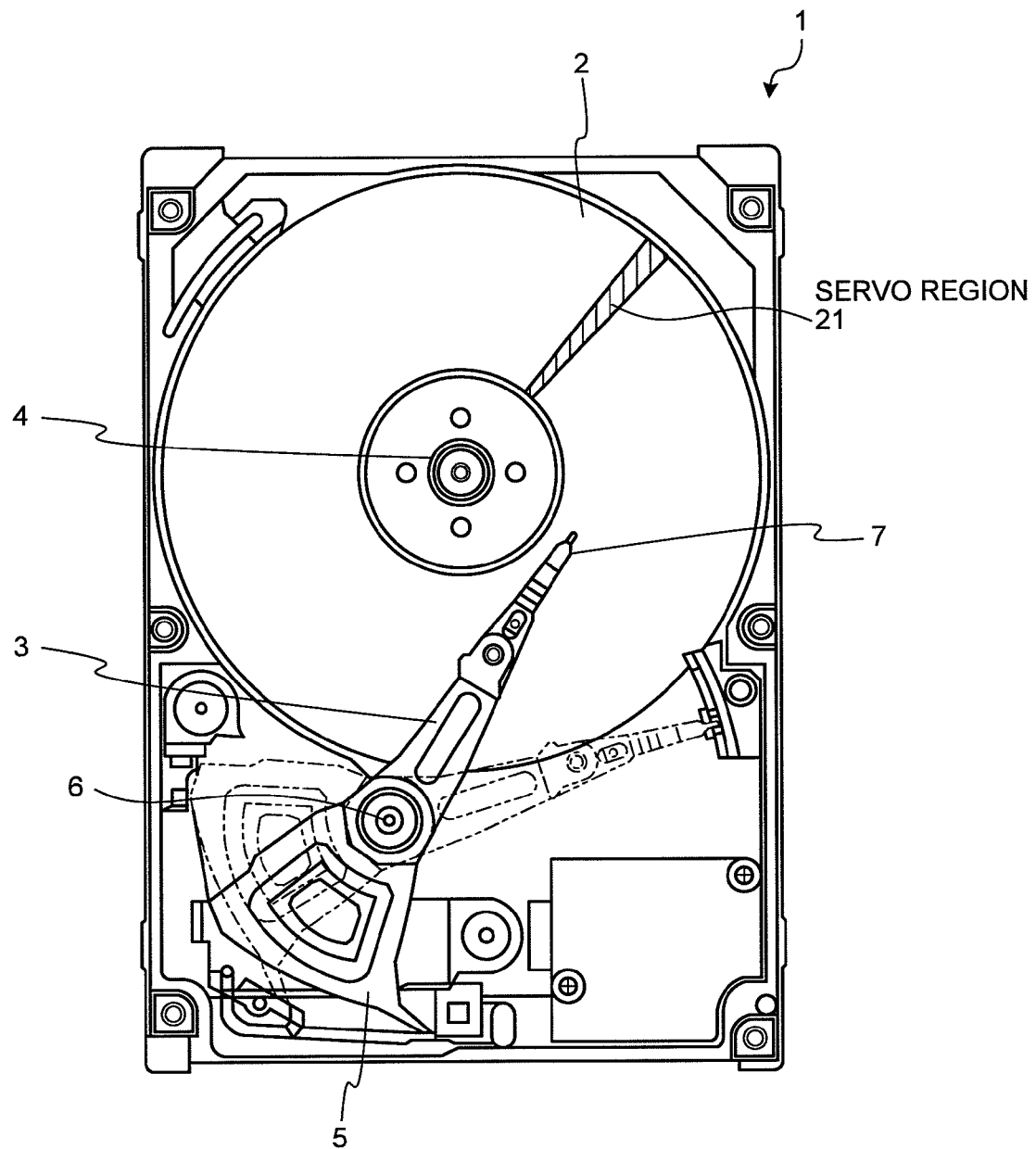
FIG. 1 is an external view illustrating an inner portion of an information storage device according to a first embodiment.

At first, an outline of an information storage device 1 according to the first embodiment is described. FIG. 1 is an external view illustrating an inner portion of the information storage device according to the first embodiment. As illustrated in FIG. 1, the information storage device 1 includes a magnetic recording medium 2, a spindle motor 4, a voice coil motor 5, and an actuator 3. A magnetic head 7 is provided at a front end of the actuator 3.

The magnetic recording medium 2 is a magnetic recording medium on which various pieces of magnetic information are recorded at a high recording density. The magnetic recording medium 2 is rotationally driven by the spindle motor (hereinafter, referred to as "SPM") 4 in a predetermined direction. The magnetic recording medium 2 has a servo region 21 (FIG. 2) formed as a pattern of convex-concavo portions on which various pieces of information are recorded. The magnetic recording medium 2 is a patterned medium on which magnetized regions for recording and reproduction are arranged so as to be separated from each other by nonmagnetized regions. The magnetized regions are isolated from each other.

The magnetic recording medium 2 has the servo region 21 (FIG. 2) that stores therein servo information, and the like, and a data region (not illustrated) that stores therein user data. The magnetic head 7 for reading from and writing into the magnetic recording medium 2 is provided at the front end of the actuator 3.

That is to say, if the voice coil motor (hereinafter, referred to as "VCM") 5 as a head driving mechanism provided at one end of the actuator 3 is driven, the actuator 3 rotationally moves on a circular arc about a shaft 6. Furthermore, a track on which reading or writing is to be performed is changed by moving the magnetic head 7 in a track width direction of the magnetic recording medium 2.

The magnetic head 7 moves to a track on which reading or writing is to be performed so as to perform reading processing or writing processing (data reading/writing processing). At this time, the magnetic head 7 keeps a state of slightly floating from a surface of the magnetic recording medium 2 with a lift force generated by the rotation of the magnetic recording medium 2.

Configuration of Magnetic Recording Medium 2

Figure 2:
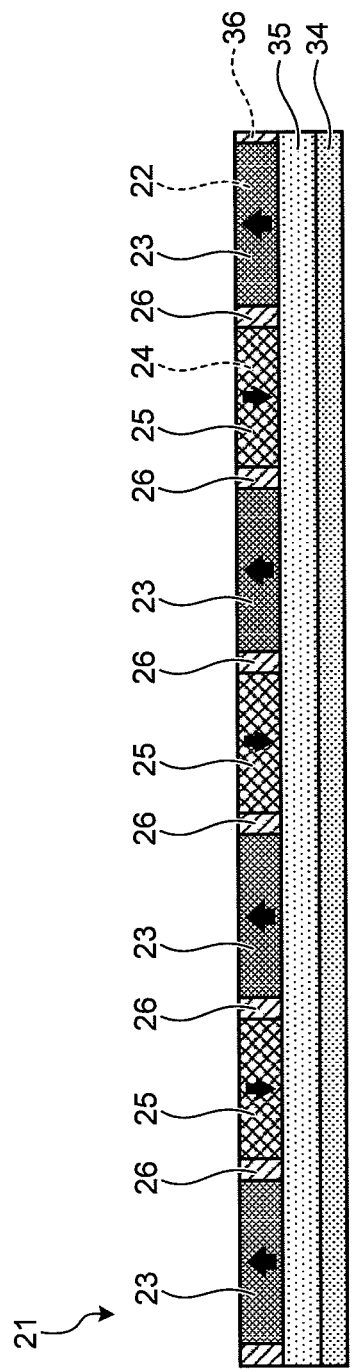
FIG. 2 is a cross-sectional view for explaining a servo pattern on a servo region illustrated in FIG. 1.

Next, a configuration of the magnetic recording medium 2 provided on the information storage device 1 is described with reference to FIG. 2. FIG. 2 is a view illustrating the configuration of the magnetic recording medium 2 that the information storage device 1 according to the first embodiment includes. FIG. 2 is a view for explaining, of a servo region and a data region that form the magnetic recording medium 2, the servo region.

The servo region 21 is a region in which servo information and the like as data used for controlling positioning of the magnetic head 7 are stored. Furthermore, a servo pattern constituting the servo region 21 as illustrated in FIG. 2 expresses bit information for servo control by arrangement of magnetized portions and nonmagnetized portions (combination of presence "1" and absence "1" of magnetism). In FIG. 2, information is expressed by presence or absence of magnetization in one direction that is either of an upward direction or a downward direction.

As illustrated in FIG. 2, an outline of the servo region 21 forming the magnetic recording medium 2 is as follows. The servo region 21 has a configuration in which an intermediate layer 34 and an intermediate layer 35 are laminated on an upper surface of a substrate 30 (FIG. 6) made of a nonmagnetic material, and a magnetic recording layer 36 on which a convex-concavo pattern is formed is provided on an upper surface of the intermediate layer 35.

Specifically, first magnetic layers 23 and second magnetic layers 25 are provided on the servo pattern forming the servo region 21. The first magnetic layers 23 are pattern portions 22 (convex portions) that output servo signals and are made of a ferromagnetic material. The second magnetic layers 25 are embedded in non-pattern portions 24 (concave portions) between the first magnetic layers 23 and are made of a ferromagnetic material. The second magnetic layers 25 have magnetization in an opposite direction so as to be antiparallel with magnetization of the first magnetic layers 23.

Figure 3:
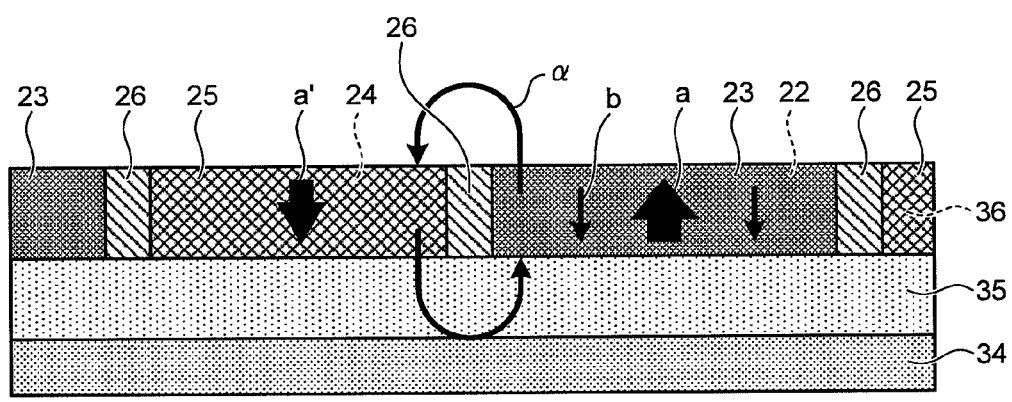
FIG. 3 is an enlarged cross-sectional view for explaining the servo pattern on the servo region.

A magnetic material having a coercive force lower than that of the first magnetic layers 23 is used for the second magnetic layers 25. Nonmagnetic layers 26 are provided between both magnetic layers 23 and 25. That is to say, as illustrated in FIG. 3, the second magnetic layers 25 have magnetization (magnetization direction a') in the opposite direction to the magnetization (magnetization direction "a") of the first magnetic layers 23 under presence of magnetostatic interaction (magnetic fields α) when an external magnetic field is small.

In this manner, the magnetizations of both magnetic layers 23 and 25 are made to be antiparallel with each other. With this configuration, the magnetization of the first magnetic layers 23 is made to be stable energetically. As a result, the magnetization of the pattern portions 22 (first magnetic layers 23) forming the servo region 21 can be made difficult to be inverted.

Figure 4:
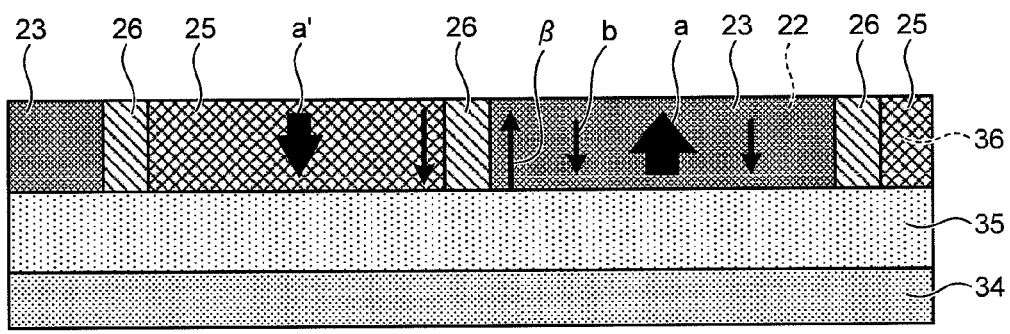
FIG. 4 is an enlarged cross-sectional view for explaining the servo pattern on the servo region.

Furthermore, in another embodiment as illustrated in FIG. 4, the nonmagnetic layers 26 made of a material generating exchange interaction (RKKY: Ruderman-Kittel-Kasuya-Yosida), such as Ru, are provided between the first magnetic layers 23 and the second magnetic layers 25.

The magnetostatic interaction and the exchange interaction act between the first magnetic layers 23 and the nonmagnetic layers 26 and between the second magnetic layers 25 and the nonmagnetic layers 26, which are arranged in the above manner. That is to say, exchange-coupling magnetic fields β through the nonmagnetic layers 26 are applied to the first magnetic layers 23 in addition to the magnetic fields α (FIG. 3) by the magnetostatic interaction of the second magnetic layers 25 (magnetization direction a'). Accordingly, the magnetization of the first magnetic layers 23 can be more stabilized.

Hereinafter, action effects by the magnetostatic interaction and the exchange interaction are described with reference to FIG. 3 and FIG. 4. FIG. 3 is an enlarged cross-sectional view for explaining the servo pattern on the servo region. Furthermore, FIG. 4 is an enlarged cross-sectional view for explaining the servo pattern on the servo region.

That is to say, as illustrated in FIG. 3, the diamagnetic fields b are present on the first magnetic layers 23 on the servo region 21. However, even when the diamagnetic fields b are present on the first magnetic layers 23 on the servo region 21 in this manner, the magnetization (magnetization direction a) of the first magnetic layers 23 is difficult to be inverted because of the magnetic fields α. The magnetic fields α are generated from the second magnetic layers 25 of which magnetization direction is opposite to the magnetization direction a of the magnetization of the first magnetic layers 23. Therefore, the magnetization of the first magnetic layers 23 is stable. The coercive force of the second magnetic layers 25 is lower than the coercive force of the first magnetic layers 23. Therefore, the magnetization of the first magnetic layers 23 is not inverted from a desired direction in which the first magnetic layers 23 have been magnetized first.

As illustrated in FIG. 4, the nonmagnetic layers 26 made of the material generating exchange interaction, such as Ru, are provided between the first magnetic layers 23 and the second magnetic layers 25. Therefore, exchange-coupling magnetic fields β through the nonmagnetic layers 26 are applied to the first magnetic layers 23 in addition to the magnetic fields α (FIG. 3). Accordingly, the magnetization of the first magnetic layers 23 can be more stabilized.

Method of Manufacturing Magnetic Recording Medium 2

Figure 5:
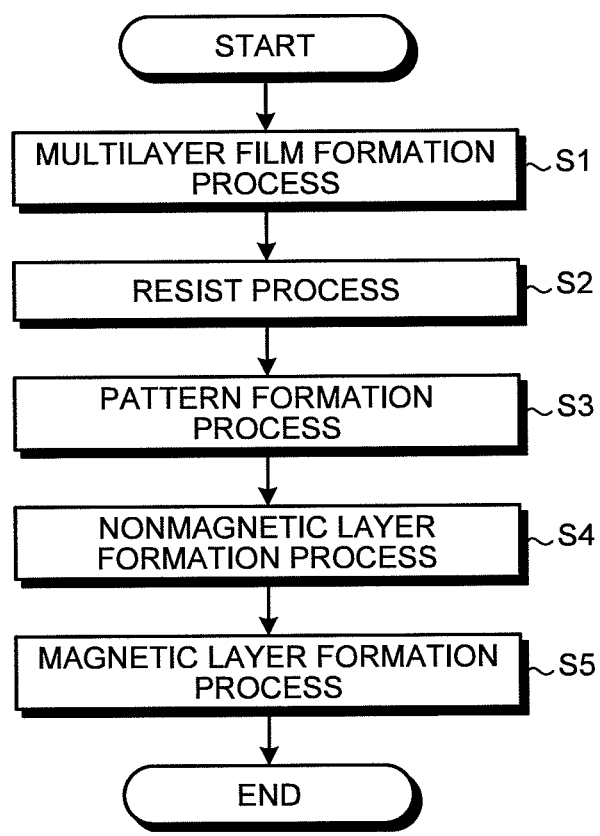
FIG. 5 is a flowchart illustrating a method of manufacturing a magnetic recording medium.

Next, the method of manufacturing the magnetic recording medium 2 according to the first embodiment is described with reference to FIG. 5 and FIG. 6 to FIG. 9. FIG. 5 is a flowchart illustrating manufacturing processes of the magnetic recording medium 2 according to the first embodiment.

Furthermore, FIG. 6 to FIG. 9 are views for explaining the manufacturing processes of the magnetic recording medium 2 according to the first embodiment. It is to be noted that in the following description, the method of manufacturing the magnetic recording medium 2 according to the embodiment is performed in a manufacturing system that manufactures the magnetic recording medium 2 in predetermined procedures.

As illustrated in the flowchart in FIG. 5, in the manufacturing system of the magnetic recording medium 2, a multilayer film formation process (step S1), a resist process (step S2), a pattern formation process (step S3), a nonmagnetic layer formation process (step S4), and a magnetic layer formation process (step S5) are performed in this order.

That is to say, as illustrated in the flowchart in FIG. 5, in the manufacturing system according to the first embodiment, the multilayer film formation process in which a plurality of thin films are laminated on an upper surface of a substrate is performed (step S1). The multilayer film formation process is a process of laminating an under layer 31, a bonding layer 32, an under layer 33, the intermediate layer 34, and the intermediate layer 35 in this order on the upper surface of the nonmagnetic substrate 30.

Figure 6:
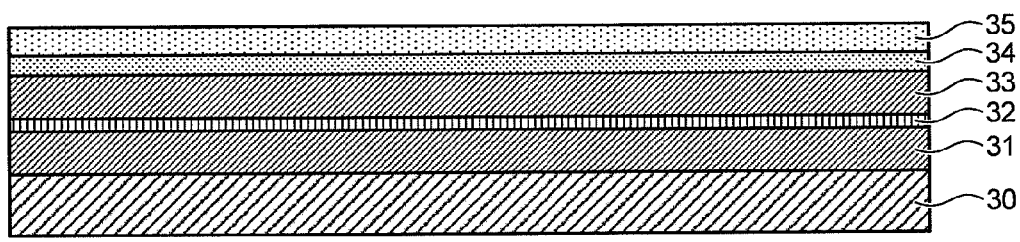
FIG. 6 is a view illustrating the method of manufacturing the magnetic recording medium.

Specifically, in the manufacturing system of the magnetic recording medium according to the first embodiment, the substrate 30 formed into a substantially disk form is prepared, as illustrated in FIG. 6. A nonmagnetic material such as an Al alloy, an Al alloy with NiP plating, and a glass material, for example, is used for the substrate 30. It is to be noted that a nonmagnetic plate of which surface has high flatness and that does not give an influence on a magnetic characteristic, and has a high mechanical strength is desirably used for the substrate 30.

Then, the under layer 31, the bonding layer 32, the under layer 33, the intermediate layer 34, and the intermediate layer 35 are laminated in this order on the upper surface of the substrate 30 by sputtering. It is to be noted that the magnetic recording layer 36 is laminated on the upper surface of the intermediate layer 35 as will be described later.

The under layer 31 is provided as a soft magnetic auxiliary layer for drawing a writing magnetic field of the magnetic head 7 (FIG. 1). Furthermore, a soft magnetic material (for example, FeCoZrTa) having a high saturation magnetization force Bs is normally used for the under layer 31.

The bonding layer 32 is a film layer body (approximately 0.5 to 3 nm) used for making magnetizations of the soft magnetic under layers 31 and 33 be antiparallel with each other. Note that the under layers 31 and 33 are laminated at the upper side and the lower side with respect to the bonding layer 32. For example, a nonmagnetic material such as Ru is used for the bonding layer 32.

The under layer 33 is provided as a soft magnetic auxiliary layer for drawing a writing magnetic field of the magnetic head 7 (FIG. 1) as in the under layer 31. Furthermore, a soft magnetic material (for example, FeCoZrTa) having a high saturation magnetization force $B_S$ is used for the under layer 33 as in the under layer 31.

The intermediate layer 34 is a film layer body for controlling crystal orientation and a diameter of crystal particles of the intermediate layer 35 that is laminated on the upper surface of the intermediate layer 34. An amorphous-based or crystal-based material (for example, Ta) is used for the intermediate layer 34.

The intermediate layer 35 is a film layer body for controlling crystal orientation and a diameter of crystal particles of a recording magnetic layer. When a Co alloy is used for the magnetic recording layer 36 that is laminated on the upper surface of the intermediate layer 35, a nonmagnetic CoCr alloy, a Ru alloy, or the like is used for the intermediate layer 35. The nonmagnetic CoCr alloy and the Ru alloy are nonmagnetic materials having the same hcp crystal configuration as that of the Co alloy. It is to be noted that the above intermediate layers 34 and 35 may be formed as three or more layers obtained by combining a plurality of materials.

Next, as illustrated in the flowchart in FIG. 5, in the manufacturing system according to the first embodiment, the resist formation process is performed in which a resist is formed on the multilayer film body (step S2). The resist formation process is a process of forming the resist on the multilayer film body and forming convex-concavo portions on the formed resist. The convex-concavo portions are formed by nanoimprint using a master having convex-concavo portions of which convex-concavo pattern is inversion of the convex-concavo pattern on the servo region 21. The resist formed in this manner serves as a resist mask for patterning.

Then, as illustrated in the flowchart in FIG. 5, in the manufacturing system according to the first embodiment, the patterning process is performed in which the upper surface of the multilayer film is patterned (step S3). The patterning process is a process of forming the plurality of first magnetic layers 23 as the pattern portions 22 at predetermined positions on the magnetic recording layer 36 formed on the upper surface of the multilayer film.

Figure 7:
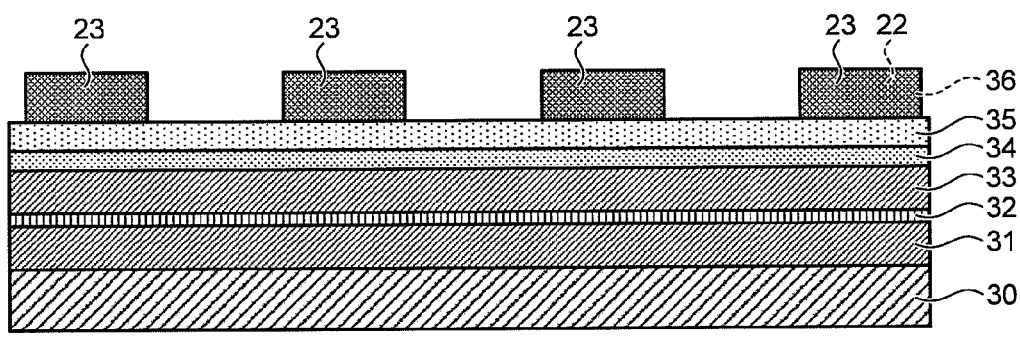
FIG. 7 is a view illustrating the method of manufacturing the magnetic recording medium.

Specifically, the intermediate layer 35 and the magnetic recording layer 36 formed on the upper surface of the intermediate layer 35 are patterned by ion etching using the resist mask formed in the resist formation process. As illustrated in FIG. 7, the first magnetic layers 23 as the plurality of pattern portions 22 can be formed at the predetermined positions corresponding to the servo region 21 (FIG. 1) on the multilayer film (upper surface of the intermediate layer 35) by the patterning.

The pattern used in this process has data portions at a period of 60 nm (each of convex portions and concave portions is approximately 30 nm). Furthermore, the servo region 21 has a predetermined period (approximately 200 to 500 nm) corresponding to a servo signal.

Next, as illustrated in the flowchart in FIG. 5, in the manufacturing system according to the first embodiment, the nonmagnetic layer formation process is performed (step S4). The nonmagnetic layer formation process is a process of forming the nonmagnetic layers 26 at predetermined positions on the non-pattern portions 24 that correspond to the servo region 21.

Figure 8:
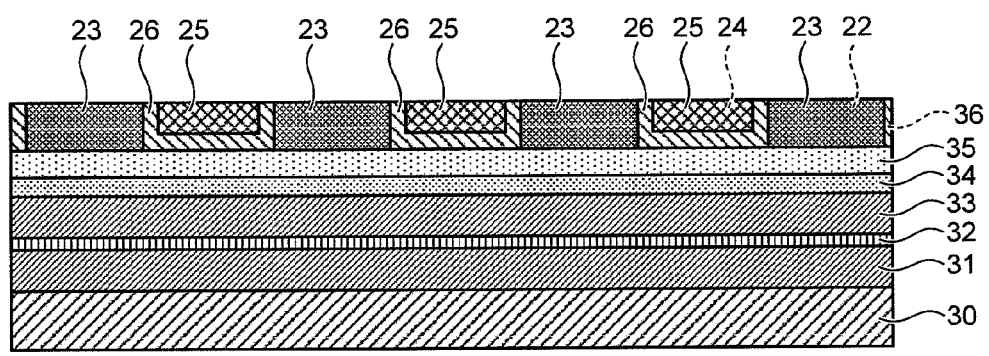
FIG. 8 is a view illustrating the method of manufacturing the magnetic recording medium.

Specifically, as illustrated in FIG. 8, the nonmagnetic layers 26 are embedded by sputtering by only an amount corresponding to the film thickness of the intermediate layer 35 in the non-pattern portions 24 as the convex portions. Ru that is a nonmagnetic material of which film thickness is approximately 0.5 to 1.5 nm is used for the nonmagnetic layers 26 so as not to give an influence on the magnetic characteristic of the first magnetic layers 23.

When the nonmagnetic layers 26 are embedded by the sputtering, sufficient sputtering can be performed on side wall portions of the pattern portions 22 by adjusting a distance between the substrate 30 and a sputtering target.

That is to say, the first magnetic layers 23 and the second magnetic layers 25 are reliably separated from each other by the sputtering. Furthermore, the nonmagnetic layers 26 are filled into a space between the first magnetic layers 23 and the second magnetic layers 25. It is to be noted that nonmagnetic CoCr or a Cr alloy other than Ru may be used as the material of the nonmagnetic layers 26.

Next, as illustrated in the flowchart in FIG. 5, in the manufacturing system according to the first embodiment, the magnetic layer formation process is performed (step S5). The magnetic layer formation process is a process of forming the second magnetic layers 25 on the non-pattern portions 24.

Specifically, the second magnetic layers 25 made of a ferromagnetic material are embedded by sputtering by only an amount corresponding to the film thickness of the magnetic recording layer 36 in the non-pattern portions 24. A ferromagnetic material on which data can be recorded with high quality, such as a CoCrPt alloy, is used for the second magnetic layers 25.

As described above, the second magnetic layers 25 are formed as magnetic layers of which magnetization is antiparallel with the magnetization of the first magnetic layers 23. Furthermore, a magnetic material having a coercive force lower than that of the first magnetic layers 23 is used for the second magnetic layers 25.

Here, one reason why the magnetic material having the coercive force lower than that of the first magnetic layers 23 is used for the second magnetic layers 25 is to provide a difference between the coercive forces so that both the magnetizations of the first magnetic layers 23 and the second magnetic layers 25 are easy to be antiparallel with each other.

Another reason thereof is as follows. That is, the first magnetic layers 23 are magnetic layers (normally, high coercive force) on which data is recorded with high quality and it is difficult to use a material having a coercive force higher than that of the first magnetic layers 23 for the second magnetic layers 25. In addition, a large magnetic field is required for format (initial magnetization) and the magnetization becomes difficult.

Figure 9:
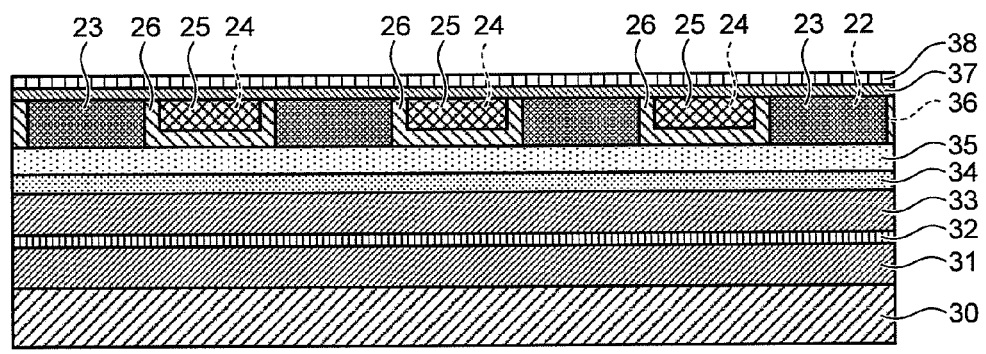
FIG. 9 is a view illustrating the method of manufacturing the magnetic recording medium.

It is to be noted that redundant portions of the second magnetic layers 25 embedded in the non-pattern portions 24 (concave portions) are subjected to etching processing such as ion beam etching (IBE) so as to be flattened. Furthermore, as illustrated in FIG. 9, a protection layer 37 such as diamond like carbon (DLC) and a fluorinated lubricating layer 38 for lubrication are laminated in this order on the flattened upper surface of the magnetic recording layer 36. Then, format for providing predetermined magnetic information to the servo pattern on the servo region 21 is performed on the magnetic recording medium 2 manufactured by the above processes of S1 to S5.

Figure 10:
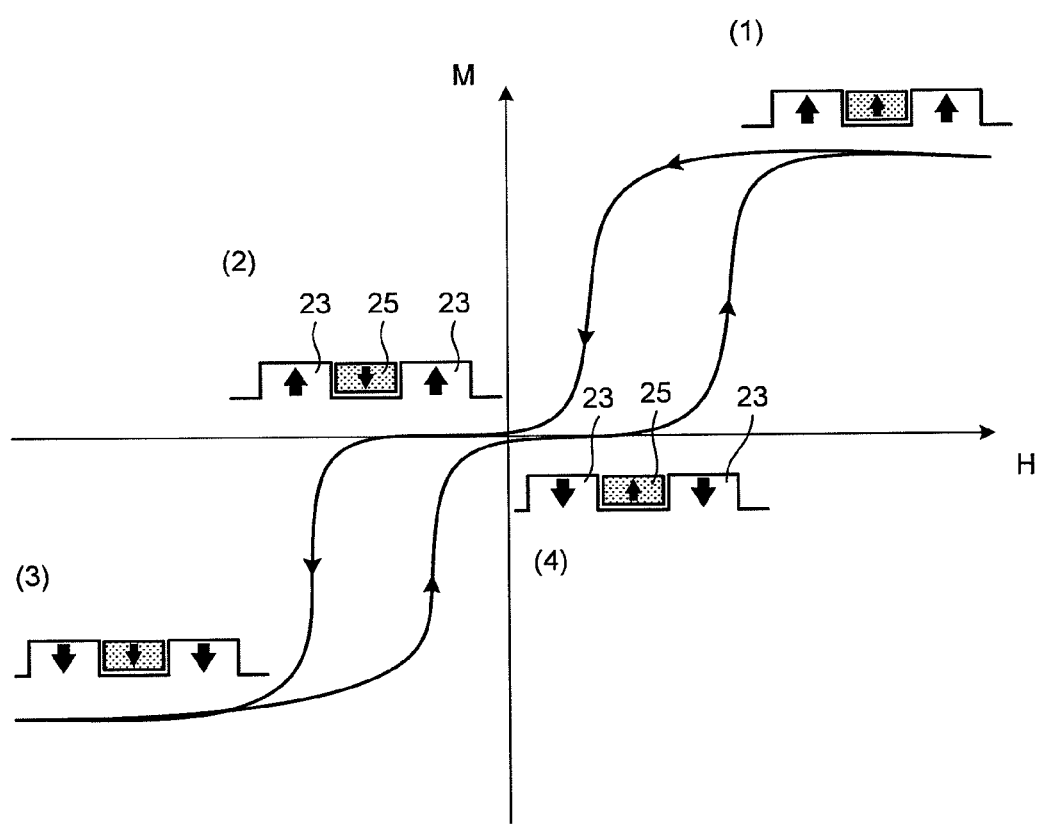
FIG. 10 is a view for explaining the method of manufacturing the magnetic recording medium.
Figure 11:
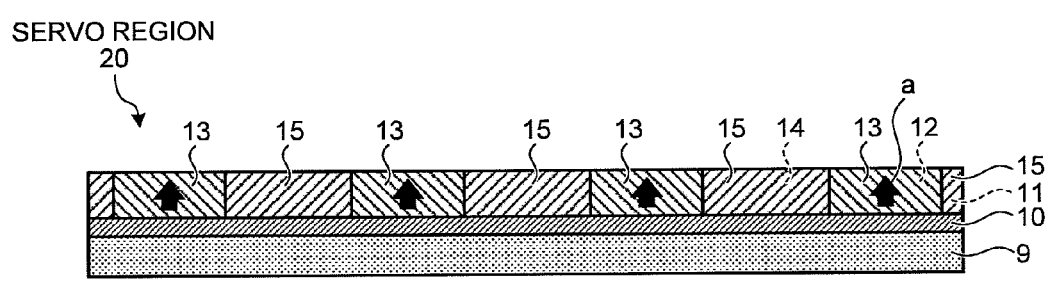
FIG. 11 is a cross-sectional view for explaining an example of a servo pattern on a conventional servo region.
Figure 12:
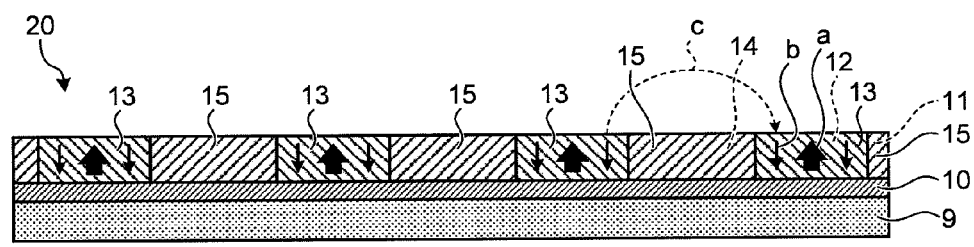
FIG. 12 is a cross-sectional view for explaining an example of a servo pattern on a conventional servo region.

Here, a method of magnetizing the first magnetic layers 23 and the second magnetic layers 25 corresponding to the servo pattern forming the servo region 21 is described. FIG. 10 is a view for explaining the method of manufacturing the magnetic recording medium and illustrates a hysteresis loop (MH loop) as a magnetic characteristic of the magnetic layer.

That is to say, an MH loop of the servo region including the convex-concavo pattern of the magnetic recording layer 36 manufactured by the method of manufacturing the magnetic recording medium according to the first embodiment is the MH loop as illustrated in FIG. 10.

FIG. 10 illustrates a case where a product of a volume and a saturation magnetization is substantially the same between the first magnetic layers 23 and the second magnetic layers 25 and a coercive force Hc of the second magnetic layers 25 is lower than that of the first magnetic layers 23. That is to say, the convex portions (first magnetic layers 23) as the pattern portions 22 are magnetized in the desired direction by applying an external magnetic field to a film surface in either of the directions perpendicular thereto as illustrated in FIG. 10.

At this time, even if the concave portions (second magnetic layers 25) are also magnetized in the same direction, the magnetization of the second magnetic layers 25 is inverted by magnetic interaction so as to be in antiparallel with the magnetization of the first magnetic layers 23 in a process where the magnetic field is eliminated.

Specifically, the magnetic recording layer of the servo pattern is magnetized in one direction (magnetizations of the first magnetic layers 23 and the second magnetic layers 25 are the upward direction) (for example, in a magnetic field of approximately 2.5 T) as illustrated in (1) of FIG. 10. Then, an external magnetic field is removed (around H=0 in FIG. 10). Thus, a servo pattern in which the magnetization of the second magnetic layers 25 is antiparallel with the magnetization of the first magnetic layers 23 as illustrated in (2) of FIG. 10 can be obtained.

In the same manner, the magnetic recording layer of the servo pattern is magnetized in one direction (magnetizations of the first magnetic layers 23 and the second magnetic layers 25 are the downward direction) as illustrated in (3) of FIG. 10. Then, an external magnetic field is removed (around H=0 in FIG. 10). Thus, a servo pattern in which the magnetization of the second magnetic layers 25 is antiparallel with the magnetization of the first magnetic layers 23 as illustrated in (4) of FIG. 10 can be obtained.

The present inventors executed a verification experiment for checking that the magnetizations of the first magnetic layers 23 and the second magnetic layers 25 forming the servo region 21 of the magnetic recording medium 2 manufactured by the method of manufacturing a magnetic recording medium according to the invention are antiparallel with each other.

Specifically, a "magnetic signal reading examination" was executed. In the "magnetic signal reading examination", a common TMR-type magnetic head used for a hard disk is used and magnetic signals are read from a region where the pattern portions 22 (concave portions) of approximately 120 nm and the non-pattern portions 24 (concave portions) of approximately 120 nm in the servo pattern are periodically continuous. Note that the pattern portions 22 (concave portions) correspond to the first magnetic layers 23 and the second magnetic layers 25 are embedded in the non-pattern portions 24 (concave portions).

That is to say, directions in which the first magnetic layers 23 and the second magnetic layers 25 are magnetized are found by the upward direction (positive "1") or the downward direction (negative "0") of the magnetic signals acquired by the "magnetic signal reading examination".

Hundred thousand signals on each of the pattern portions 22 (convex portions) and the non-pattern portions 24 (concave portions) were examined by the "magnetic signal reading examination". As a result, it was found that all the first magnetic layers 23 have magnetizations in the same direction and all the second magnetic layers 25 have magnetizations in one direction opposite to the direction of the magnetizations of the convex portions.

As described above, it was found that the magnetic recording medium according to the invention can be realized only by exposing a medium manufactured by the method of manufacturing the magnetic recording medium according to the first embodiment to a magnetic field in one direction without individually magnetizing the first magnetic layers 23 and the second magnetic layers 25 on the servo pattern forming the servo region 21.

As described above, with the magnetic recording medium according to the first embodiment, the servo region 21 is formed by the first magnetic layers 23 as the pattern portions 22, the second magnetic layers 25, and the nonmagnetic layers 26. Note that the second magnetic layers 25 are magnetized in antiparallel with the magnetization direction of the first magnetic layers 23 and formed as the non-pattern portions 24 of which coercive force is lower than that of the first magnetic layers 23. Furthermore, the nonmagnetic layers 26 are formed between the first magnetic layers 23 and the second magnetic layers 25. Therefore, the magnetization in the servo pattern on the servo region 21 can be stabilized.

REFERENCE SIGNS LIST

1 Information storage device
2 Magnetic recording medium
3 Actuator
4 Spindle motor
5 Voice coil motor
6 Shaft
7 Magnetic head
9, 30 Substrate
10, 34, 35 Intermediate layer
11, 36 Magnetic recording layer
20, 21 Servo region
22 Pattern portion
23 First magnetic layer
24 Non-pattern portion
25 Second magnetic layer
26 Nonmagnetic layer
31, 33 Under layer
32 Bonding layer
37 Protection layer
38 Lubricating layer

The invention claimed is:
1. A magnetic recording medium comprising a magnetic recording layer that includes:
  a first magnetic layer formed as a pattern portion that is a data portion in a servo region;
  a second magnetic layer formed as a non-pattern portion that is magnetized to be antiparallel with a magnetiza- tion direction of the first magnetic layer and of which coercive force is lower than a coercive force of the first magnetic layer; and a nonmagnetic layer formed between the first magnetic layer and the second magnetic layer, wherein the nonmagnetic layer is formed of Ru.

2. The magnetic recording medium according to claim 1, wherein the first magnetic layer and the second magnetic layer are made of ferromagnetic material.

3. The magnetic recording medium according to claim 1, wherein the first magnetic layer and the second magnetic layer are made of Co alloy.

4. An information storage device comprising:

a magnetic recording medium including a magnetic recording layer that includes a first magnetic layer formed as a pattern portion that is a data portion in a servo region, a second magnetic layer formed as a non-pattern portion that is magnetized so as to be antiparallel with a magnetization direction of the first magnetic layer and of which coercive force is lower than a coercive force of the first magnetic layer, and a nonmagnetic layer formed between the first magnetic layer and the second magnetic layer, wherein the nonmagnetic layer is formed of Ru; and a magnetic head that performs data reading/writing processing on the magnetic recording medium.

5. A method of manufacturing a magnetic recording medium, the magnetic recording medium comprising a magnetic recording layer that includes:

a first magnetic layer formed as a pattern portion that is a data portion in a servo region;

a second magnetic layer formed as a non-pattern portion that is magnetized to be antiparallel with a magnetization direction of the first magnetic layer and of which coercive force is lower than a coercive force of the first magnetic layer; and a nonmagnetic layer formed between the first magnetic layer and the second magnetic layer, wherein the nonmagnetic layer is formed of Ru, the method comprising:

a pattern formation process of forming the second magnetic layer as a non-pattern portion that is magnetized so as to be antiparallel with a magnetization direction of the first magnetic layer formed as a pattern portion in a servo region and of which coercive force is lower than a coercive force of the first magnetic layer; and a nonmagnetic layer formation process of forming the nonmagnetic layer made of a nonmagnetic material between the first magnetic layer and the second magnetic layer formed at the pattern formation process.

* * * * *